United States Patent
Benz et al.

(10) Patent No.: US 6,518,543 B1
(45) Date of Patent: Feb. 11, 2003

(54) METHOD FOR MAKING DEFINED CONICAL HOLES USING A LASER BEAM

(75) Inventors: Gerhard Benz, Boeblingen (DE); Thomas Wawra, Boebmenkirch (DE); Rainer Schneider, Mahlerten (DE); Achim Eisemann, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,065

(22) PCT Filed: Feb. 11, 2000

(86) PCT No.: PCT/DE00/00405
§ 371 (c)(1),
(2), (4) Date: Dec. 26, 2000

(87) PCT Pub. No.: WO00/47359
PCT Pub. Date: Aug. 17, 2000

(30) Foreign Application Priority Data

Feb. 11, 1999 (DE) .......................... 199 05 571

(51) Int. Cl.[7] .......................... B23K 26/38; B23K 26/06
(52) U.S. Cl. .............................. 219/121.71; 219/121.7; 219/121.73
(58) Field of Search .................. 219/121.7, 121.71, 219/121.73, 121.75

(56) References Cited

U.S. PATENT DOCUMENTS

| | | | |
|---|---|---|---|
| 3,576,965 A | * | 5/1971 | Gugger |
| 4,336,439 A | | 6/1982 | Sasnett et al. |
| 4,547,651 A | * | 10/1985 | Maruyama |
| 4,822,957 A | | 4/1989 | Leighton |
| 4,822,974 A | | 4/1989 | Leighton .............. 219/121.67 |
| 4,908,493 A | | 3/1990 | Susemihl |
| 5,043,553 A | * | 8/1991 | Corfe et al. .............. 219/121.7 |
| 5,670,064 A | * | 9/1997 | Nakata ................... 219/121.73 |
| 6,057,525 A | * | 5/2000 | Chang et al. .......... 219/121.73 |
| 6,172,329 B1 | * | 1/2001 | Shoemaker et al. ... 219/121.71 |
| 6,268,586 B1 | * | 7/2001 | Stuart et al. |

FOREIGN PATENT DOCUMENTS

| | | | |
|---|---|---|---|
| CH | 13 357/67 | | 1/1969 |
| CH | 572 798 | | 2/1976 |
| DD | 275425 | A1 * | 1/1990 |
| DE | 33 17 022 | | 11/1984 |
| DE | 690 04 225 | | 5/1994 |
| DE | 39 33 448 | | 10/1998 |
| DE | 197 45 280 | | 4/1999 |
| DE | 19744368 | A1 * | 5/1999 |
| EP | 0 432 258 | | 1/1991 |
| GB | 2262253 | A * | 6/1993 |

OTHER PUBLICATIONS

"Prazionslaserstrahlfertigungstechnik fur den Maschinenbau," (Precision Laser Beam Production Technique For Machine Construction), Final Report FORLASI, Jan. 1, 1994–Jul. 31, 1997, pp. 112–118. (English abstract provided).

Tonshoff et al., "Microdrilling Of Metals With Ultrashort Laser Pulses", Proceedings of the Laser Materials Processing Conference Section A–ICALEO 1998, Orlando, FL, Nov. 16–19, 1998.

* cited by examiner

Primary Examiner—Geoffrey S. Evans
(74) Attorney, Agent, or Firm—Kenyon & Kenyon

(57) ABSTRACT

A method for producing bore holes, including conical bore holes, having a definite hole geometry in the longitudinal direction of the bore hole by adjusting the beam geometry and/or the beam parameters of a laser beam.

13 Claims, 3 Drawing Sheets a)

b)

c)

METHOD FOR MAKING DEFINED CONICAL HOLES USING A LASER BEAM

FIELD OF THE INVENTION

The present invention relates to a method of producing holes in a workpiece using a laser beam.

BACKGROUND INFORMATION

For a plurality of applications, for example, for manufacturing injection nozzles for gasoline and diesel vehicle engines, the production of holes with a definite hole geometry in the longitudinal direction of the bore hole is desirable. In particular, producing conical bore holes having a cross-section increasing toward one end may be required.

Such conical holes may be produced using wire corrosion, in which the conical geometry of the bore hole is produced by vibration of the erosion wire. This method may, however, represent a problem for small bore hole diameters in the range below 150 $\mu$m due to the minimum wire diameter required for stability reasons. However, the production of small bore holes having high precision may for example, be required for injection nozzles. Furthermore, the wire corrosion method is believed to have the disadvantage that the conical hole geometry is difficult to reproduce and that the method is relatively slow and therefore cost-intensive.

SUMMARY OF THE INVENTION

With the exemplary method according to the present invention for producing holes in a workpiece using a laser beam, a definite hole geometry of the bore hole in its longitudinal direction can be obtained by adjusting the beam geometry and/or beam parameters of the laser beam. The bore hole may have a conical shape, and the bore hole diameter may increase in the direction of the beam exit. The exemplary method according to the present invention is believed to have the advantage that, by adjusting the beam geometry and/or the beam parameters of the laser beam, very flexible hole geometries can be produced with great precision. Another advantage is believed to be that the exemplary method according to the present invention can also be used for very small hole diameters in the range of 100 $\mu$m and less. In addition, the drilling method is believed to be considerably faster compared to known drilling methods, which may provide considerable savings when used in industrial production.

According to an exemplary method according to the present invention, the laser beam is focused on the workpiece using a lens, the focal distance of the lens, the beam diameter at the point where the beam enters the lens, the focal diameter, and the power density of the laser beam is selected so that a conical bore hole is obtained. The focal area of the laser beam may be on the workpiece surface at the entry of the hole. After the focal area, the laser beam widens again, whereby, if the power density is sufficient, a conical longitudinal bore hole profile is obtained.

In order to obtain a very narrow laser beam bundle in the focal area, it may be expedient to widen the cross-section of the laser beam before it passes through the lens. A telescope-like lens arrangement which can be placed in the path of the beam almost anywhere between the laser and the lens can be used for this purpose.

According to another exemplary method according to the present invention, the laser beam performs a wobbling motion with respect to the workpiece, describing a conical surface. The longitudinal profile of the bore hole can be accurately defined through the wobbling motion. If the laser beam is also rotated about its own axis synchronously with the wobbling motion, the same point of the laser beam comes into contact with the workpiece in the azimuthal direction each time. Thereby an eccentric laser beam cross-section is equalized and very round hole cross examplary are obtained.

According to another variant of the method according to the present invention, the hole geometry in the longitudinal direction can be adjusted with the help of polarized laser light by selecting the direction of polarization and/or type of polarization. An oval hole geometry can be produced on the exit side of the laser beam by using a linearly polarized laser beam. Particularly round hole cross-sections can be achieved using circularly polarized laser light.

It is also possible to combine the wobbling motion of the laser beam with a definite polarization.

A device to according to an exemplary embodiment of the present invention for producing holes in a workpiece has a laser beam source, a lens for focusing the laser beam on the workpiece, a device for producing a wobbling motion of the laser beam, and a rotatable polarization device having a half-wave plate and a quarter-wave plate that can be rotated with respect to the half-wave plate.

DETAILED DESCRIPTION

Figure 1:
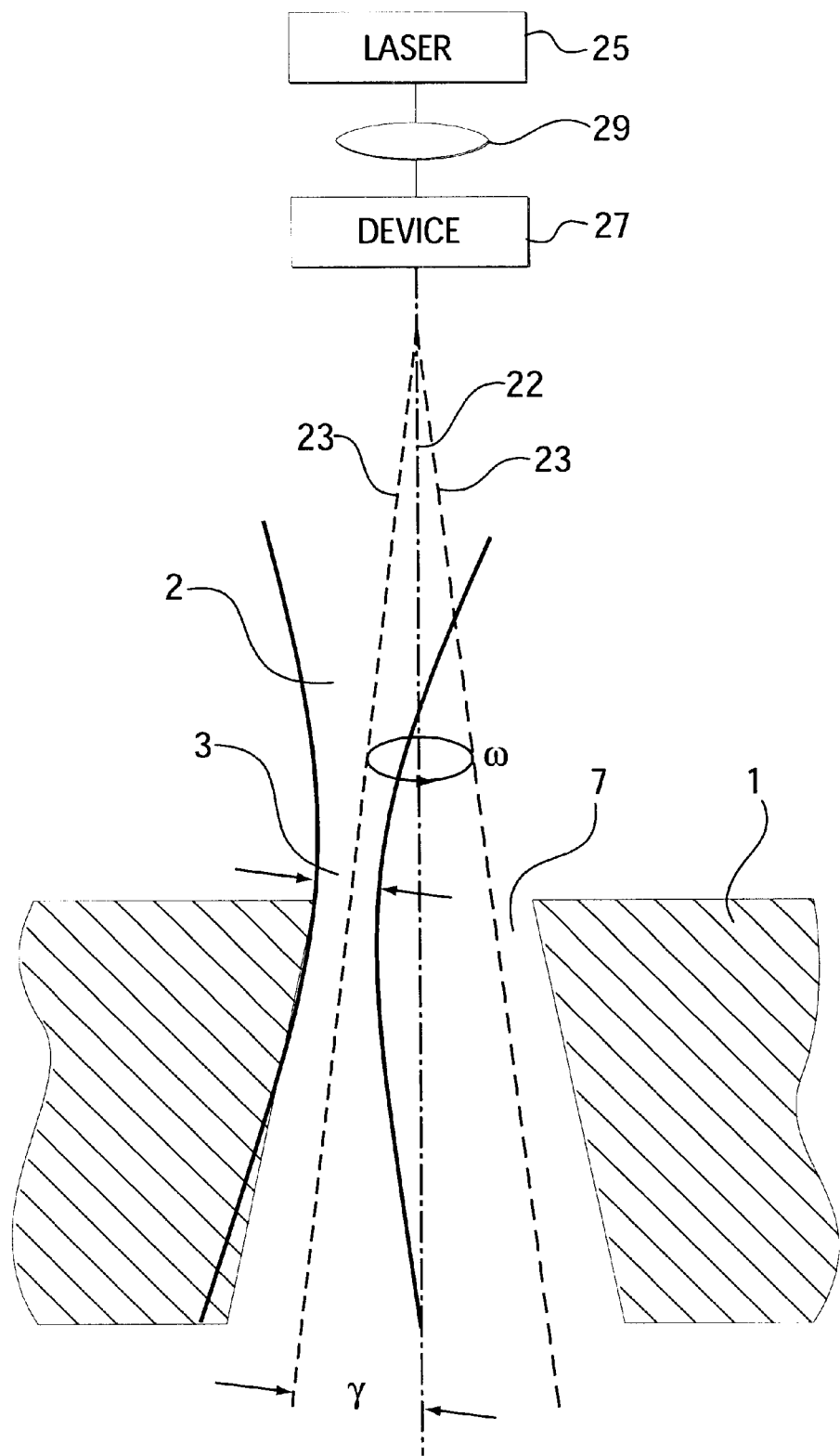
FIG. 1 shows a schematic cross-section of the production of a conical hole in a workpiece using a moving laser beam.

FIG. 1 schematically shows the cross-section of a laser drilling operation for producing a hole 7 in a workpiece 1, using a laser 2 from a laser beam source 25 and a lens 29. A device 27 for producing a wobbling motion γ or rotational movement γ of the laser beam 2 having a beam diameter 3 can be placed at any location between the laser beam source 25 and the surface of the work piece 1.

According to an exemplary method according to the present invention, a definite hole conicity can be produced by adjusting the focal distance of the lens, the beam diameter at the point where the beam enters the lens, the focal diameter, and the power density of the laser beam. The focusing number which is the quotient between the focal distance of the lens and the beam diameter of the beam as it enters the lens has a particular importance here. The focusing number is a measure of the beam divergence, i.e. the beam diameter in the focal area. The lower the focusing number, the more pronounced the conicity of the hole produced with the laser beam if the power density is sufficient. Typical focusing numbers may range from 8 to 25.

If the laser beam is focused on the workpiece surface, the hole diameter at the point of entry of the beam is mainly determined by the focal diameter. The remaining shape of the hole and the diameter at the point of exit of the beam can be adjusted by the beam propagation defined by the focusing number and the beam quality. In order to project the beam profile on the bore hole, it is important that the power density of the laser beam be greater than the threshold intensity for the material corrosion process in the entire hole area.

A definite hole conicity can also be obtained by an appropriate wobbling motion γ of the laser beam 2. This method is illustrated in FIG. 1. Laser beam 2 whose profile is schematically shown in the longitudinal direction is rotated about a center axis indicated by a dot-dashed line 22 with an angular frequency ∩ on a conical surface indicated by a dashed line 23. The path of this rotational movement γ, together with the beam cross-section 3, provides the desired shape of the hole 7. The relative motion between the laser beam 2 and the workpiece I is decisive, so that either the laser beam 2 or the workpiece 1, or both may move, the first-named variant being the easiest to implement technically in the case of complicated workpiece 1 geometries.

If the laser beam is rotated synchronously at the same time about its own axis according to the rotational frequency of the wobbling motion, the same point of the laser beam comes into contact with the workpiece in the azimuthal direction every time. Extremely round holes can be produced in this manner because any non-uniformity of the laser beam cross-section is compensated. The rotational motion can in turn be achieved by rotating either the laser beam source or the workpiece.

According to another exemplary method according to the present invention, a definite hole geometry is set by an appropriate selection of the direction and type of polarization of the laser beam. The polarization of a laser beam is absorbed differently depending on the orientation of the direction of polarization. The exit of the hole is mainly determined by the polarization of the laser light. In order to obtain a circular hole exit, circular polarization is required, which can be obtained from linearly polarized light by an appropriate angular arrangement of a quarter-wave plate. In another exemplary method of producing a circular hole exit in connection with the method illustrated in FIG. 1, the plane of polarization of the laser beam is rotated synchronously with the wobbling motion using a half-wave plate or an image rotator.

Figure 2:
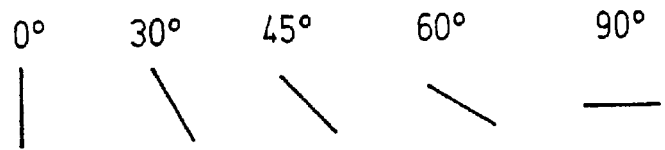
FIG. 2 schematically shows a polarization device for producing different polarization angles and types of polarization.
Figure 2:
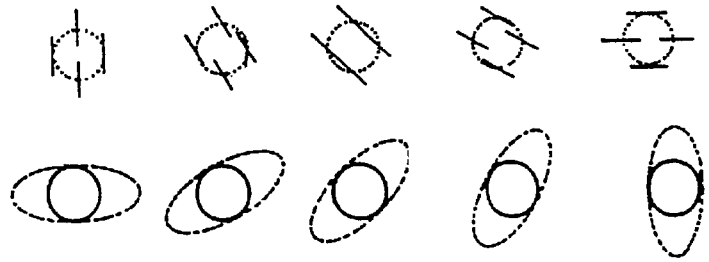
Figure 2:
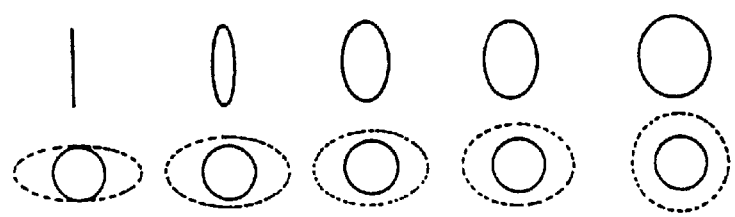
Figure 2:
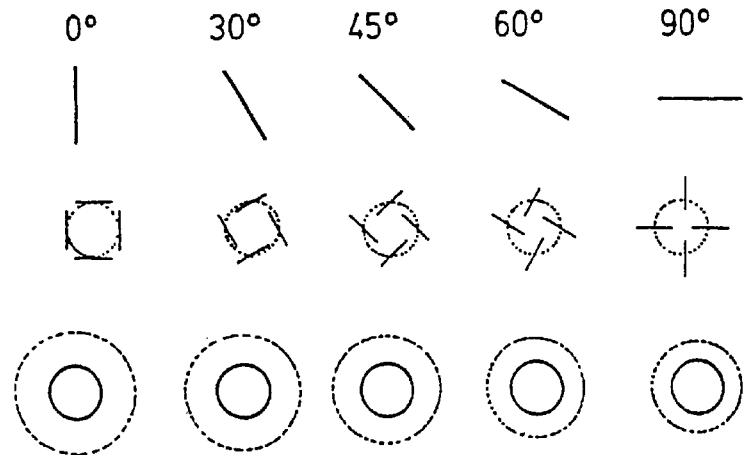
Figure 3:
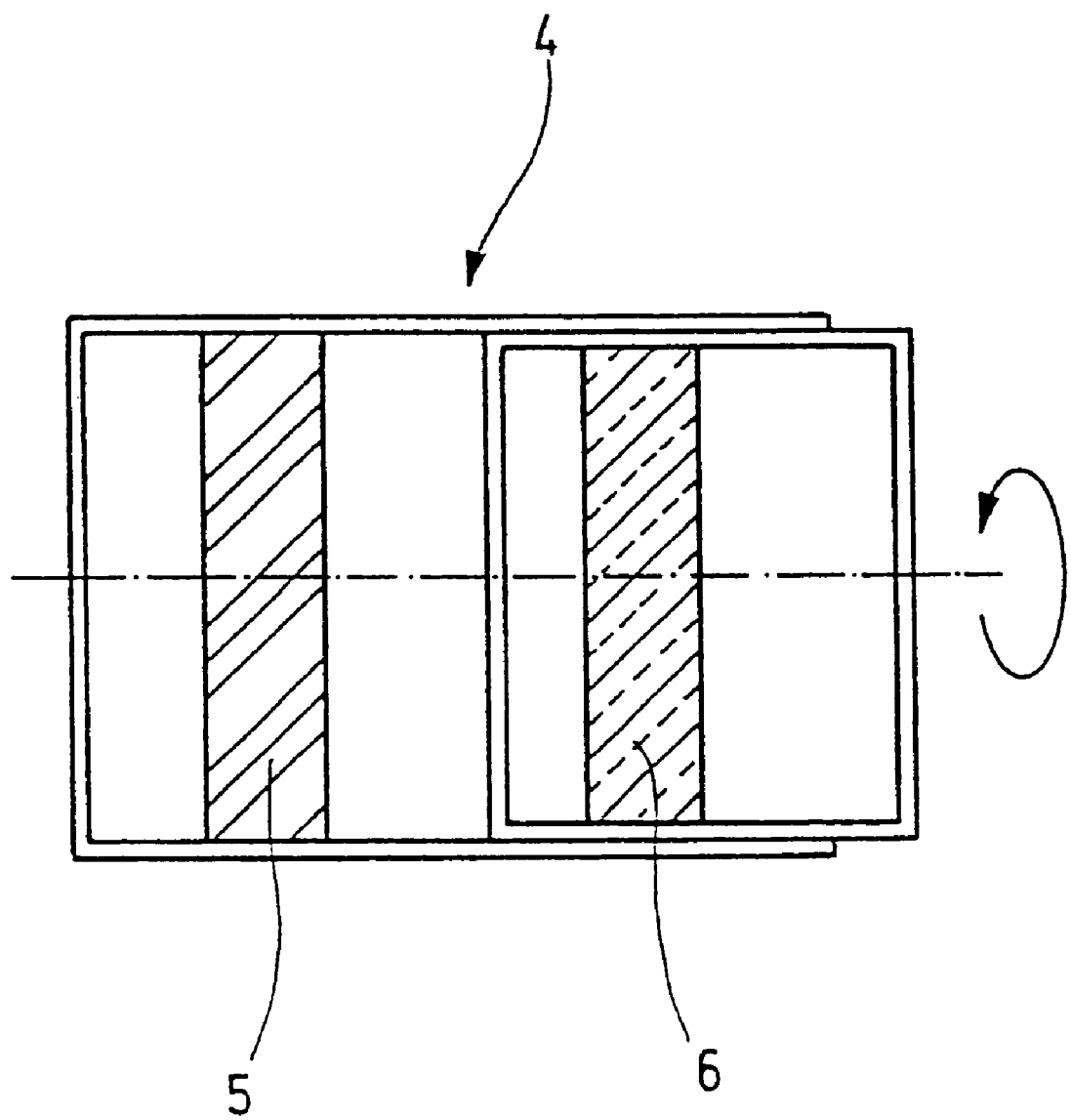
FIG. 3 schematically shows the hole geometry as a function of the polarization of the laser beam.

A polarizator device for obtaining such a definite polarization is schematically shown in FIG. 3. Polarization device 4 has a half-wave plate 5 and a quarter-wave plate 6 mounted rotatably with respect to the half-wave plate. Depending on the position of the quarter-wave plate with respect to the half-wave plate, the polarization of the laser beam can be set between linear polarization (FIG. 2b far left) and circular polarization (FIG. 2b far right). The plane of polarization can be rotated by rotating the entire polarization device 4.

FIG. 2 schematically shows the effect of different types of polarization on the hole geometry.

Definite oval hole exit cross-sections can be produced using linear polarization of the laser beam. FIG. 2a shows five examples of polarization angles between 0° (perpendicular polarization) to 90° (parallel polarization), the laser beam simultaneously performing a wobbling motion, which is illustrated in the second line of FIG. 2a. The hole cross section at the hole entry is illustrated in the third line of FIG. 2a by a solid line; the hole exit is shown by a dotted line.

FIG. 2b shows the transition from linear polarization (on the left) to circular polarization (on the right). While the hole cross-section is round at the hole entry in both cases, the cross-section at the hole exit (dotted line) is only round in the case of circular polarization. By changing the type of polarization from circular to linear, a definite oval shape can be achieved at the hole exit, the longitudinal plane of the oval being perpendicular to the plane of polarization.

FIG. 2c illustrates an exemplary method in which the plane of polarization is rotated together with the wobbling motion γ of the laser beam 2. In each case, a round hole cross-section is obtained both at the hole entry and the hole exit. The hole diameter at the hole exit and thus the conicity varies, however, as a function of whether the plane of polarization is radial to the circular motion of the laser beam 2 (FIG. 2c, right) or tangential thereto (FIG. 2c, left). In the first case, a less pronounced hole conicity is obtained than in the second case. Thus, the hole conicity can be adjusted in a defined manner by rotating the plane of polarization.

Using the exemplary methods according to the present invention, accurate bore holes with a definite longitudinal profile, in particular conical bore holes can be obtained by adjusting the beam geometry and/or beam parameters of a laser beam. The methods are also well suited for holes having small diameters in the range of 100 μm and less and are therefore believed to be particularly advantageous for manufacturing injection nozzles or the like.

What is claimed is:

1. A method for producing a bore hole in a workpiece, the method comprising the steps of:

providing a laser beam;

focusing the laser beam on the workpiece using a lens;

selecting a focal distance of the lens, a laser beam diameter at a point where the laser beam enters the lens, a focal diameter, and a power density of the laser beam for producing the bore hole having a conical shape;

causing the laser beam to perform a wobbling motion with respect to the workpiece to describe the conical shape in the bore hole; and producing a definite: hole geometry of the bore hole in its longitudinal direction using the laser beam.

2. The method of claim 1, wherein a diameter of the bore hole increases in a direction of an exit of the laser beam.

3. The method of claim 1, wherein the laser beam widens prior to reaching the lens.

4. The method of claim 1, wherein a focal area of the laser beam passing through the lens is on a workpiece surface at an entry point of the bore hole.

5. The method of claim 1, wherein a focal area of the laser beam at an entry point of the bore hole is on a surface of the workpiece.

6. The method of claim 1, further comprising the step of rotating the laser beam about its own axis synchronously with the wobbling motion.

7. The method of claim 1, wherein the laser beam is a linearly polarized laser beam whose plane of polarization is rotated synchronously with the wobbling motion.

8. The method of claim 1, wherein a geometry of the bore hole is adjustable by selecting at least one of a direction of polarization and a type of polarization.

9. The method of claim 8, wherein the laser beam is a linearly polarized laser beam.

10. The method of claim 8, wherein the laser beam is a circularly polarized laser beam.

11. The method of claim 1, wherein the laser beam is polarized using a half-wave plate and a quarter-wave plate.

12. The method of claim 1, wherein the laser beam is polarized using a half-wave plate and a quarter-wave plate, and wherein the quarter-wave plate being rotatable with respect to the half-wave plate.

13. A device for producing a bore hole in a workpiece, the device comprising:

a laser beam source for providing a laser beam;

a lens for focusing the laser beam on the workpiece;

a device for producing a wobbling motion of the laser beam, wherein the wobbling motion of the laser beam describes a conical surface of the bore hole; and a rotatably arranged polarization device including a half-wave plate and a quarterwave plate, the quarter-wave plate being rotatable with respect to the half-wave plate.

* * * * *

UNITED STATES PATENT AND TRADEMARK OFFICE
CERTIFICATE OF CORRECTION

PATENT NO. : 6,518,543 B1 Page 1 of 1
DATED : February 11, 2003
INVENTOR(S) : Benz et al.

It is certified that error appears in the above-identified patent and that said Letters Patent is hereby corrected as shown below:

Column 1,
Line 25, change "may for" to -- may, for --

Column 2,
Line 15, change "variant of the" to -- exemplary --

Column 3,
Line 17, change "∩" to -- ω --
Line 21, change "workpiece I" to -- workpiece 1 --

Signed and Sealed this

Thirteenth Day of January, 2004

JON W. DUDAS
*Acting Director of the United States Patent and Trademark Office*